United States Patent Office 2,872,000
Patented Feb. 3, 1959

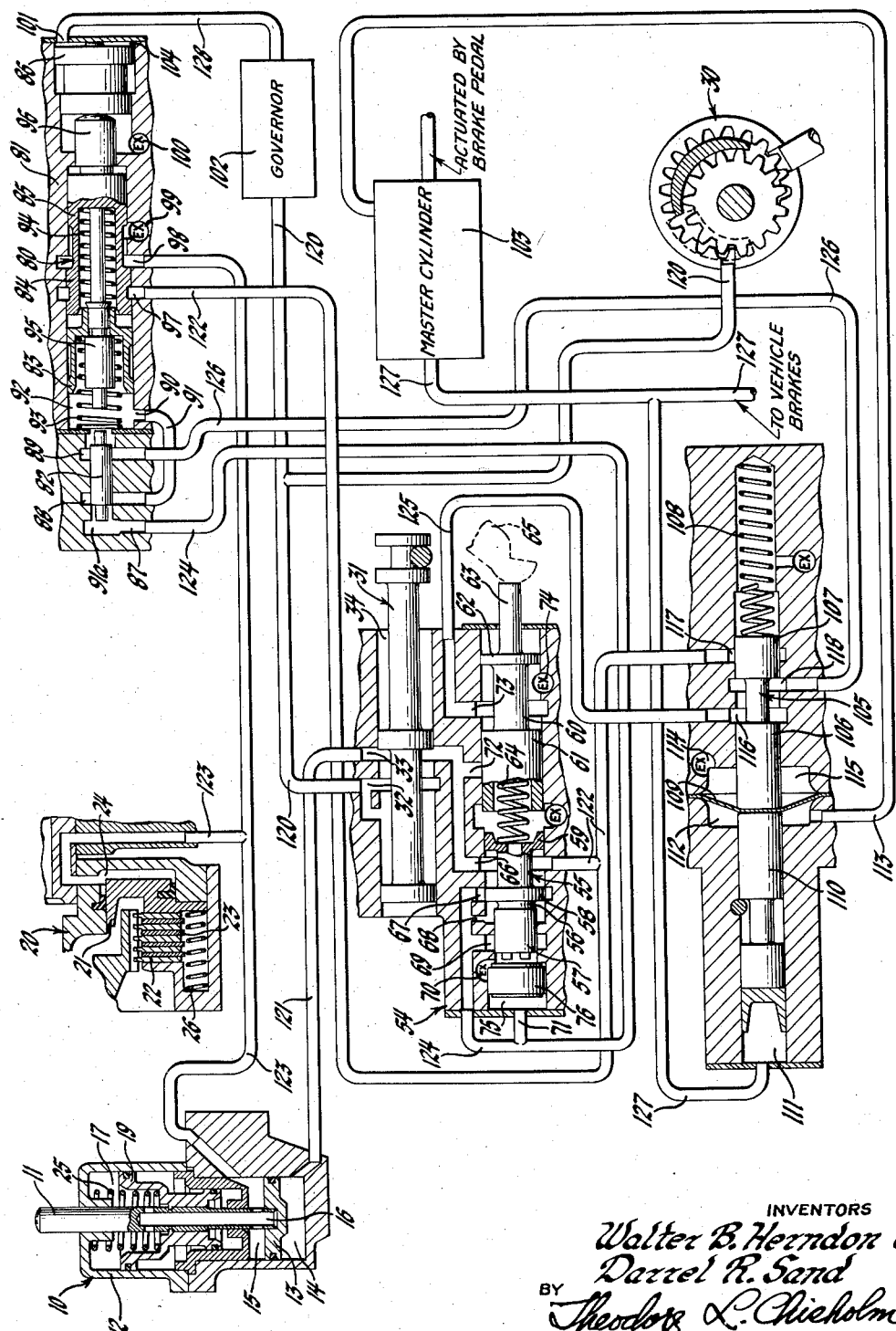

2,872,000

TRANSMISSION AND BRAKE CONTROL SYSTEM

Walter B. Herndon, Rochester, and Darrel R. Sand, Royal Oak, Mich., assignors to General Motors Corporation, Detroit, Mich., a corporation of Delaware Application May 13, 1953, Serial No. 354,832

6 Claims. (Cl. 192—4)

This invention relates to transmission control systems and more particularly to a transmission control system for a vehicle adapted to provide for change of drive ratio in the transmission when the vehicle brake is applied. More particularly, it is an object of this invention to provide in a plural ratio automatically controlled vehicle transmission, means automatically operative without any attention on the part of the vehicle operator to downshift the transmission drive ratio when the vehicle is being braked. This automatic downshift of the transmission is of advantage as an assist in vehicle braking since it automatically provides for increased engine braking when the operator depresses the brake pedal. Such engine braking is of great value in assisting the vehicle brakes to stop the vehicle, particularly in hilly or mountainous country where the vehicle brakes may be continuously applied for relatively long periods of time. The automatic downshift of the transmission provided by this control system minimizes the braking effort which the vehicle brakes may be called upon to supply, thus reducing the time period during which the vehicle brakes must be applied and preventing over-heating and "fading" of the vehicle brakes.

The control system of this invention incorporates a valve responsive to the vehicle master brake cylinder for admitting pump line pressure to a shift valve to position the transmission shift valve to downshift the transmission. The downshift controlled by the transmission shift valve may be a downshift from over-drive to direct drive if desired, but in the embodiment shown, the downshift provided by depressing the vehicle brake pedal is a downshift from direct drive to reduction drive in the transmission.

The invention represents an improvement for automatically shiftable transmissions of the type disclosed in the application of Walter B. Herndon, Serial Number 235,213, filed July 5, 1951. In view of the prior disclosure of a complete transmission control system to which this invention may be applied in the above identified application for Letters Patent, the present invention is shown schematically in the single figure, being limited to a single pair of transmission servo members adapted to be selectively actuated to select a pair of transmission drive ratios. It will be understood, however, that the invention may be applied to any of the transmission servo members of the said application for Letters Patent.

An object of this invention is to provide means responsive to movement of the vehicle brake pedal to a brake application position to cause a downshift of transmission drive ratio to assist the vehicle brakes in slowing down a vehicle.

A further object of this invention is to provide automatically operable hydraulic means operative upon application of the vehicle brakes to cause a change of transmission drive ratio.

Another object of this invention is to provide a valve member controlled by a vehicle brake master cylinder for providing automatic change of transmission drive ratio upon application of the vehicle brakes.

A further object of this invention is to provide in a transmission control system including a shift valve normally controlled as a function of vehicle speed and engine torque demand, an overriding control between the vehicle brake applying means and the transmission drive ratio control system for causing a transmission downshift upon application of the vehicle brakes.

The above recited advantages and other features and objects of this invention will be apparent from the following description and claims, taken in conjunction with the following drawing, in which:

The figure shows a schematic diagram of a control system for a transmission embodying the features of this invention.

Referring to the diagram, there is shown a pair of fluid pressure actuated servo units consisting of a band servo 10 and a clutch servo 20. When the band servo 10 is energized to apply a band (not shown) to a drum (not shown) one element of a planetary gearing unit is braked to provide a reaction member for reduction drive through planetary gearing. Band servo 10 may brake a planetary sun gear for reduction drive. When the clutch servo 20 is energized, clutch plates 22 and 23 are engaged to clutch a pair of elements of a planetary gearing unit to each other for direct drive through the planetary gearing unit. Clutch servo 20 may lock a sun gear to a ring gear for direct drive. The gearing and servos are fully described in the application for Letters Patent Serial No. 235,213, filed July 5, 1951.

The control system of the present invention includes a pump 30, a manually operable valve 31, a shift valve 80, a valve 60 controlled by the vehicle accelerator pedal, and a valve 105 controlled by the vehicle brake master cylinder 103. Pump 30 may be engine driven and an additional pump (not shown) driven in response to vehicle speed as by the vehicle tail shaft (not shown) may be provided if desired.

The reduction drive servo 10 is composed of a stem 11 adapted to apply a band (not shown) for establishing reduction drive when the stem 11 is forced outwardly from the casing 12. A piston 13 at the base of stem 11 separates a chamber 14 from chamber 15. Stem 11 is provided with a passage 16 to hydraulically connect a chamber 15 with a chamber 17. A spring 25 tends to move stem 11 to release the band (not shown). A piston 19 is fixed to stem 11.

The direct drive clutch servo 20 for establishing direct drive through the planetary gearing unit consists of a piston 21 adapted to engage clutch plates 22 and 23 when fluid pressure is admitted to a chamber 24. A spring 26 releases the clutch plates when pressure is exhausted from chamber 24.

Pump line pressure from pump 30 is conducted to port 32 of a manually operable valve 31 and to a governor 102 through a passage 120. In the drive position of valve 31 as illustrated in the figure, line pressure from passage 120 is admitted to chamber 14 of servo 10 through ports 32 and 33 of valve 31 and passage 121. In reduction drive, chambers 15 and 17 of servo 10 are connected to exhaust through a passage 123 and ports 98 and 99 of a shift valve 80. Pressure in chamber 14 is then effective to move stem 11 outwardly from casing 12 for establishing reduction drive.

A pressure metering valve 55 is provided with a valve body 56 composed of lands 57, 58 and 59 and a plunger valve member 60 composed of lands 61 and 62 and a stem 63. A spring 64 is interposed between one end of valve 55 and the adjacent end of plunger valve 60. Stem 63 is forced inwardly against spring 64 by a cam 65 operated by the vehicle accelerator pedal (not shown) as the accelerator pedal is moved to supply an increasing quantity of gasoline to the vehicle engine. Casing 54 is supplied with ports 66, 67, 68, 69, 70 and 71, all associated with valve 55. Casing 54 is also provided with ports 72, 73 and 74 associated with plunger valve 60. Port 66 admits pump line pressure from manually operable valve 31 to a chamber between lands 58 and 59. Port 67 is a pressure delivery port for admitting pressure to passage 124. Ports 68 and 69 connect passage 124 to the valve bore. Port 70 exhausts to the transmission sump, and port 71 admits pressure from passage 124 to a chamber 75 at one end of a detent plug 76. It will be noted that the diameter of land 58 is greater than that of land 57. Pressure delivered to passage 124 reacts upon land 58, tending to move the valve 55 against spring 64 to cut off the admission of fluid to passage 124. Detent plug 76 provides a yieldable resistance which the vehicle driver can feel in pressing the accelerator pedal to its forced downshift position, but which is not felt during normal movement of the accelerator pedal. As stem 63 is moved into the casing against spring 64, the pressure level of fluid pressure in passage 124 increases. Port 72 admits pump line pressure to the valve bore adjacent land 61. Port 73 connects to a passage 125 and port 74 exhausts to the transmission sump.

A shift valve 80 in a casing 81 is adapted to be moved from a reduction drive position to a direct drive position for selecting direct drive. Casing 81 is drilled for a shuttle member 82, for a piston 83, valve member 80, and a governor plug 86. Casing 81 is provided with ports 87, 88, 89 and 90. Port 87 connects to passage 124 to admit variable pressure from valve 55 to a chamber 91a. Ports 88 and 90 are connected by a passage 91 to admit pressure from chamber 91a to a chamber 92. Port 89 connects to a passage 126. A pair of springs 93 and 94 tend to bias the valve member 80 to its downshift or reduction drive position. A stem 95 carried by piston 83 contacts shuttle stem 82 when pressure is admitted to chamber 91a. Valve member 80 is composed of a pair of lands 84 and 85 and is provided with a stem 96 adapted to contact a governor plug 86. Port 97 connects to a line pressure supply passage 122. Port 98 connects to a passage 123. Ports 99 and 100 exhaust to the transmission sump, and port 101 connects to a governor pressure delivery passage 128. Pressure in passage 128 is delivered thereto by a governor (shown schematically at 102) adapted to deliver a variable pressure which increases with increase in vehicle speed. A governor of the type which may be employed is shown in Figure 5 of the patent to Earl A. Thompson, 2,204,872, issued June 18, 1940. The governor may be driven by the vehicle drive shaft so as to be responsive to vehicle speed.

Shift valve 80 is illustrated in its downshift position wherein passage 123 leading to band servo 10 and clutch servo 20 is connected to exhaust port 99 through port 98. In its upshift position valve 80 connects passage 122 to passage 123 by way of ports 97 and 98 to admit line pressure to passage 123 to release the reduction drive servo and actuate the direct drive clutch.

Further referring to the figure, there is schematically shown a conventional vehicle brake master cylinder 103 of the type adapted to deliver fluid pressure to the vehicle brakes for brake application when the vehicle brake pedal is depressed. When the brake pedal (not shown) is depressed to apply the vehicle brakes, master cylinder 103 delivers fluid under pressure to passage 127. When the brake pedal is released, fluid in passage 127 is drawn back through passage 127 into the master cylinder.

An additional valve member 105 composed of lands 106 and 107 is initially spring biased by a spring 108 to connect passage 125 to passage 126, both passages 125 and 126 being normally connected to exhaust through ports 73 and 74 of plunger valve 60. Plunger 60 is movable through a first range of movement for causing valve 55 to deliver a variable pressure to passage 124 while maintaining passage 125 connected to exhaust port 74 through port 73. When, however, the accelerator pedal is fully depressed, plunger 60 connects passage 125 to line pressure through ports 72 and 73 to provide an accelerator pedal controlled forced downshift. A diaphragm 109 separates one end of land 106 from the adjacent end of a plunger 110 movable in response to pressure which may be admitted to a chamber 111 to move valve 105 against spring 108. A chamber 112 is connected by a passage 113 to the sump of the master cylinder 103 to prevent any fluid trap that otherwise might develop due to leakage of fluid from chamber 111 past plunger 110. Port 114 connects a chamber 115 to the transmission sump to prevent any fluid block due to leakage of fluid past land 106 of valve 105. Port 116 connects to passage 125 leading to port 73 of plunger valve 60. Port 117 admits pump line pressure from line pressure supply passage 122 to the valve bore. Port 118 connects to delivery passage 126 leading to port 89 of shift valve 80.

Operation

When the manually operable valve 31 is moved one notch to the left from the position shown, pressure in passage 121 and chamber 14 of servo 10 is exhausted through ports 33 and 34 of the manually operable valve to release the reduction drive servo 10. The clutch servo 20 is exhausted through passage 123 and ports 98 and 99 of shift valve 80. With both the band servo and clutch servo released, the transmission is in neutral.

With the manually operable valve positioned for forward drive as illustrated, pump line pressure is admitted to chamber 14 of servo 10 by way of passages 120 and 121 to establish reduction drive. Upon vehicle acceleration, governor pressure in chamber 104 beneath governor plug 86 acting upon governor plug 86 builds up until at some vehicle speed the shift valve is moved to its upshift or direct drive position. In the upshift position of valve 80, line pressure is admitted from passage 122 to passage 123 through ports 97 and 98 of valve 80. Pressure in passage 123 is supplied to clutch servo chamber 24 to apply the direct drive clutch and is also supplied to chambers 15 and 17 of servo 10 to release the reduction drive servo 10. This pressure in chambers 15 and 17 and the force of spring 25 will release the reduction drive servo even though pressure is simultaneously being supplied to chamber 14 of servo 10 by way of ports 32 and 33 of valve 31 and passage 121.

In normal operation, the timing of the shift of shift valve 80 is a function of vehicle speed and engine torque demand. Valve 55 delivers a variable pressure which increases with increase of engine throttle opening to passage 124 to one end of pin 82 and through passage 91 to chamber 92 of piston 83, tending to downshift the valve. Governor pressure, acting upon governor plug 86 tends to upshift the valve. When the accelerator pedal is fully depressed, line pressure is admitted to passage 125 by way of ports 72 and 73 of plunger valve 60. This line pressure is conducted to chamber 92 by way of ports 116 and 118 of valve 105, passage 126, and port 89. Unless the vehicle speed be excessive, line pressure in chamber 92 will be effective to overcome the effect of governor pressure in chamber 104 to downshift the shift valve for forced downshift to reduction drive. This forced downshift is particularly useful for rapid acceleration in passing other vehicles.

In order to provide additional braking force to assist the vehicle brakes in stopping the vehicle, the valve 105, controlled by the brake system master cylinder 103 is provided. Upon application of the vehicle wheel brakes, the master cylinder 103 delivers fluid under pressure to passage 127 and chamber 111 adjacent one end of plunger 110. This pressure is effective to move valve body 105 against spring 108 to cut off passage 125 and to connect ports 117 and 118. Line pressure is thereupon admitted from passage 122 to passage 126 and to chamber 92 of shift valve 80, causing a forced downshift of transmission drive ratio. This downshift of transmission drive ratio provides increased engine braking acting to assist the vehicle brakes in slowing down the vehicle. This feature is particularly useful in descending long grades where continuous brake application is necessary and in assisting in the rapid deceleration of the vehicle. At high vehicle speeds, and after prolonged continuous use, it is known that brakes have a tendency to "fade" and to overheat. This arrangement is of assistance in overcoming these braking problems. As soon as the vehicle brake pedal is released, oil in passage 127 is drawn back into the master cylinder, permitting spring 108 to move valve 105 back to its normal operation position. Oil pressure in passage 126 will thereupon be exhausted through passage 125 and ports 73 and 74 of the plunger valve 60 to permit normal control of the shift valve 80.

There has thus been provided an automatically operable means controlled by the vehicle brake pedal for causing transmission downshift upon application of the vehicle brakes. While the particular embodiment described consists of a hydraulic control, it will be understood that other control means responsive to the application of the vehicle brakes might be employed.

We claim:

1. In a control system for a vehicle transmission having a plurality of fluid pressure responsive servo members operable to establish a plurality of transmission drive ratios, a fluid pressure source, a shift valve for controlling the admission of fluid pressure to said servo members to select the transmission drive ratio, vehicle speed responsive mechanism for applying force to move said valve to select one transmission drive ratio, vehicle brake controlling means, and valve means controlled by said vehicle brake controlling means effective to direct fluid pressure to said shift valve for moving said shift valve to select a second transmission drive ratio when said vehicle brakes are applied.

2. In a control system for a vehicle transmission having a plurality of fluid pressure responsive servo members operable to establish a plurality of transmission drive ratios, a fluid pressure source, a shift valve for controlling the admission of fluid pressure to said servo members to select the transmission drive ratio, means for positioning said shift valve to select one transmission drive ratio, means for applying the vehicle brakes, an additional valve controlled by said brake applying means connected to said fluid pressure source, a passage conecting said additional valve to said shift valve, and means yieldably biasing said additional valve to connect said passage to exhaust, said additional valve being movable in response to actuation of said brake applying means to apply the vehicle brakes to connect said passage to said fluid pressure source for moving said shift valve to select a second transmission drive ratio.

3. In a control system for a vehicle transmission having a plurality of fluid pressure responsive servo members operable to establish a plurality of transmission drive ratios, a fluid pressure source, a shift valve for controlling the admission of fluid pressure to said servo members to select the transmission drive ratio, vehicle speed responsive mechanism for positioning said shift valve to select one transmission drive ratio, a brake valve, a passage connecting said brake valve to said shift valve, a manually operable plunger hydraulically connected to said brake valve, a hydraulic connection from said fluid pressure source to said brake valve, an exhaust port associated with said plunger, means normally biasing said brake valve to connect said passage to said exhaust port, means for applying said vehicle brakes, and means responsive to said means for applying said vehicle brakes for positioning said brake valve to connect said passage to said fluid pressure source for moving said shift valve to select another transmission drive ratio.

4. In a control system for a vehicle transmission having a plurality of fluid pressure responsive servo members operable to establish a plurality of transmission drive ratios, a fluid pressure source, a shift valve for controlling the admission of fluid pressure to said servo members to select the transmission drive ratio, means for positioning said shift valve to select one drive ratio, a master cylinder for applying the vehicle brakes, an additional valve controlled by said master cylinder connected to said fluid pressure source, a passage connecting said additional valve to said shift valve, and means yieldably biasing said additional valve to connect said passage to exhaust, said master cylinder being effective to position said additional valve to connect said passage to said fluid pressure source for positioning said shift valve to select a second transmission drive ratio when said vehicle brakes are applied.

5. In a control system for a vehicle transmission having a plurality of fluid pressure responsive servo members operable to establish a plurality of transmission drive ratios, a fluid pressure source, a shift valve for controlling the admission of fluid pressure to said servo members to select the transmission drive ratio, means for positioning said shift valve to select one transmission drive ratio, a master cylinder for applying the vehicle brakes, an additional valve controlled by said master cylinder connected to said fluid pressure source, a passage connecting said additional valve to said shift valve, a manually operable plunger connected to said fluid pressure source and to said additional valve, an exhaust port associated with said plunger, and means yieldably biasing said additional valve to normally connect said passage to said plunger through said additional valve, said plunger being movable through a first range of movement wherein said passage is connected to said exhaust port and movable to a second position for connecting said passage to said fluid pressure source through said additional valve for positioning said shift valve to select a second transmission drive ratio.

6. In a control system for a vehicle transmission having a plurality of fluid pressure responsive servo members operable to establish a plurality of transmission drive ratios, a fluid pressure source, a shift valve for controlling the admission of fluid pressure to said servo members to select the transmission drive ratio, vehicle speed responsive means for positioning said shift valve to select one transmission drive ratio, a master cylinder for applying the vehicle brakes, an additional valve controlled by said master cylinder connected to said fluid pressure source, a passage connecting said additional valve to said shift valve, a manually operable plunger connected to said fluid pressure source and to said additional valve, an exhaust port associated with said plunger, means yieldably biasing said additional valve to normally connect said passage to said plunger through said additional valve, said plunger being movable through a first range of movement wherein said passage is connected to exhaust and movable to a second position to direct fluid pressure to said passage through said additional valve, said additional valve being movable responsive to fluid pressure delivered by said master cylinder to connect said passage to said fluid pressure source for establishing a second transmission drive ratio irrespective of the position of said plunger when said master cylinder is actuated to apply the vehicle brakes.

References Cited in the file of this patent

UNITED STATES PATENTS

| | | |
|---|---|---|
| 1,910,180 | Poncelot | May 23, 1933 |
| 1,980,797 | Hale | Nov. 13, 1934 |
| 1,980,798 | Hale | Nov. 13, 1934 |
| 2,103,540 | Livermore | Dec. 28, 1937 |
| 2,186,334 | Hale | Jan. 9, 1940 |
| 2,263,707 | Strige | Nov. 25, 1941 |
| 2,299,475 | Farmer | Oct. 20, 1942 |
| 2,349,350 | Jandasek | May 23, 1944 |
| 2,408,008 | Tipton | Sept. 24, 1946 |